United States Patent Office 3,652,626
Patented Mar. 28, 1972

---

3,652,626
PROCESS FOR THE PREPARATION OF COMPOUNDS WITH TRIORGANOSILYLETHYNYL GROUPS
Georges Bakassian, Caluire, and André Bazouin, Luzinay, France, assignors to Rhone-Poulenc S.A., Paris, France
No Drawing. Filed Feb. 12, 1971, Ser. No. 115,053
Claims priority, application France, Feb. 13, 1970, 7005153
Int. Cl. C07f 7/08
U.S. Cl. 260—448.2 E                 10 Claims

ABSTRACT OF THE DISCLOSURE

Tri-hydrocarbyl-silyl acetylenes are obtained by reacting trichloroethylene and a tri-hydrocarbylchlorosilane with zinc or magnesium in the presence of a hexaalkylphosphotriamide or an N-alkyl-pyrrolidone.

---

The present invention relates to the production of triorganosilylacetylenes.

It is known that trimethylsilylacetylene can be prepared by reacting trichloroethylene with trimethylchlorosilane and lithium, in tetrahydrofurane, see R. West and L. C. Quass, J. Organometal. Chem. 18 55–67 (1969). This process, however, suffers from disadvantages because it requires the use of lithium, and must be carried out at a low temperature.

The present invention provides a process for the preparation of a triorganosilylacetylene of general formula $$(R_1)_3Si-C \equiv CH$$ 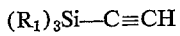

in which the radicals $R_1$, which may be identical or different, each a monovalent hydrocarbon radical which is a saturated or unsaturated aliphatic or cycloaliphatic radical, or an aromatic or aralkyl radical, which comprises reacting (a) trichloroethylene, (b) magnesium or zinc and (c) a chlorosilane of formula $(R_1)_3Si$—Cl in a reaction medium consisting of a hexaalkylphosphotriamide or an N-alkylpyrrolidone.

The reaction can be schematically represented as follows:

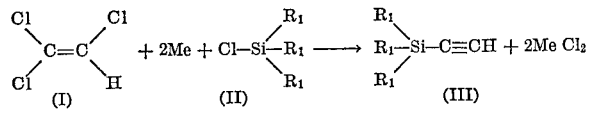

In these formulae, Me represents magnesium or zinc and the radicals $R_1$ are as defined above.

The reaction media may be a hexaalkylphosphotriamide or N-alkyl pyrrolidone respectively of the general formulae:

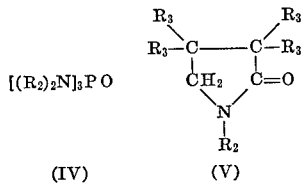

wherein the radicals $R_2$, which may be identical or different, each is a straight or branched alkyl radical of 1 to 4 carbon atoms or a cycloalkyl radical having 5 or 6 ring carbon atoms. The radicals $R_3$, which may be identical or different, each is one of the radicals set out in the definition of $R_2$ or is a hydrogen atom. In practice, for obvious reasons of simplicity, either hexamethylphosphotriamide or N-methylpyrrolidone are generally used, these being solvents usually employed in industry.

The process according to the invention is applicable to numerous chlorosilanes of Formula II. Amongst these, chlorosilanes (II) wherein radicals $R_1$, which can be identical or different, each is a straight or branched alkyl or alkenyl radical having up to 4 carbon atoms, a cycloalkyl radical having 5 to 6 ring carbon atoms, a phenyl radical, or an alkylphenyl or phenylalkyl radical in which the alkyl group is straight or branched chain and has 1 to 4 carbon atoms, are of particular interest.

Specific chlorosilanes which can be used include trimethylchlorosilane, methyldiphenylchlorosilane, dimethylphenylchlorosilane, vinyldimethylchlorosilane, cyclohexyldimethylchlorosilane and methylditolylchlorosilane.

The reagents can be used in varying proportions, but it is obvious that the optimum proportions will be close to those which take into account the stoichiometry of the reaction as set out above. However, as a general rule a slight excess of metal and of organochlorosilane will always be used.

The amount of organic solvent used is not critical. In general, at least 4 molecules of solvent are used per molecule of trichloroethylene, and the preferred amount of solvent is between 6 and 16 mols per mol of trichloroethylene involved in the reaction.

The reaction is generally carried out at a temperature of between 20 and 140° C. and preferably between 60 and 120° C. Various methods of working are possible, depending on the sequence and the manner in which the various reagents are introduced into the reaction medium. In practice, the metal and the solvent are placed in the reaction flask, the mixture is heated to the desired temperature for carrying out the reaction, and the mixture consisting of the trichloroethylene and the chlorosilane is then introduced slowly and uniformly, whilst keeping the temperature constant. When the addition if finished, the reaction mixture is kept at a constant temperature for several hours. The triorganosilylacetylene so obtained is isolated from the reaction medium by any known method. Amongst these, distillation is particularly simple and effective.

Triorganosilylacetylene is an organosilicon compound having numerous industrial uses, for example in the production of silicon products possessing reactive groups, by addition of various compounds to the triple bond.

The following examples are given to illustrate the invention:

EXAMPLE 1

105 g. of magnesium and 1500 cm.³ of hexamethylphosphotriamide (HMPT) are introduced into a 3 l. flask, and a mixture consisting of 263 g. of trichloroethylene and 259 g. of trimethylchlorosilane are run in over the course of 4 hours. The reaction mixture is heated under reflux at 104° C. for 5 hours, and is then distilled under atmospheric pressure, and to give a fraction $F_1$ of boiling point=50–53° containing 46.5 g. of trimethylsilylacetylene and 30 g. of trimethylchlorosilane. Pure trimethylsilylacetylene is isolated by rectification.

EXAMPLE 2

A mixture consisting of 498 g. of trichloroethylene and 760 g. of trimethylchlorosilane is run into a flask containing 588 g. of zinc and 3000 cm.³ of HMPT, in accordance with the method of working described in Example 1. The whole mixture is heated at 90° C. for 4 hours. Distillation followed by rectification gives a fraction $F_1$ of boiling point$_{760}$:51.2–52.2°, containing 229 g. of pure trimethylsilylacetylene. The yield of trimethylsilylacetylene is 62%.

EXAMPLE 3

131 g. of zinc and 600 ml. of N-methylpyrrolidone are introduced into a 2 litre reactor, following the method of working described in Example 1. A mixture of trimethylchlorosilane (119 g.) and trichloroethylene (132 g.) is run onto the zinc at about 100° C. Throughout the addition, which lasts for 2 hours 30 minutes, the temperature is kept at between 100 and 110° C. After the end of the addition, the mixture is heated under reflux for 3 hours.

35.4 g. of trimethylsilylacetylene of 80% purity are obtained by distillation.

EXAMPLE 4

A mixture of 132 g. of trichloroethylene and 170.5 g. of dimethylphenylchlorosilane is run onto 46.8 g. of magnesium in 1000 ml. of hexamethylphosphotriamide at 90° C., following the method of working described in the previous examples. Throughout the addition, which lasts for 80 minutes, the temperature of the reaction mixture is kept at between 100 and 110° C. After the end of the addition, the whole mixture is heated at 140° C. for 3 hours.

Rapid distillation, followed by rectification, gives 40 g. of 90% pure dimethylphenylethylsilane, (boiling point$_{18mm}$=84–87° C.).

We claim:

1. A process for the preparation of a triorganosilylacetylene of general formula $$(R_1)_3Si-C\equiv CH$$

in which the radicals $R_1$, which may be identical or different, each is a monovalent hydrocarbon radical which is a saturated or unsaturated aliphatic or cycloaliphatic radical, or an aromatic or aralkyl radical, which comprises reacting (a) trichloroethylene, (b) magnesium or zinc and (c) a chlorosilane of formula $(R_1)_3Si-Cl$ in a reaction medium consisting of a hexaalkylphosphotriamide or an N-alkylpyrrolidone.

2. A process according to claim 1 wherein the hexaalkylphosphotriamide is one of formula $[(R_2)_2N]_3PO$ where the radicals $R_2$, which may be identical or different, each is a straight or branched chain alkyl radical of 1–4 carbon atoms or a cycloalkyl radical having 5–6 ring carbon atoms.

3. A process according to claim 2 wherein the hexaalkylphosphotriamide is hexamethylphosphotriamide.

4. A process according to claim 1 wherein the N-alkyl pyrrolidone is one or formula

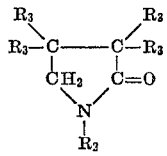

where $R_2$ is a straight or branched chain alkyl radical of 1–4 carbon atoms or a cycloalkyl radical having 5–6 ring carbon atoms and the $R_3$ radicals, which may be the same or different, each is a hydrogen atom or a straight or branched chain alkyl radical of 1–4 carbon atoms or a cycloalkyl radical having 5–6 ring carbon atoms.

5. A process according to claim 4 wherein the N-alkyl pyrrolidone is N-methyl-pyrrolidone.

6. A process according to claim 1 wherein the chlorosilane is one in which the radicals $R_1$, which may be the same or different, each is a straight or branched chain alkyl radical having 1–4 carbon atoms or a phenyl radical.

7. A process according to claim 1 wherein about 2 gm. atoms of magnesium or zinc and about 1 gm. mole of chlorosilane are used per mole of trichloroethylene.

8. A process according to claim 1 wherein 6–16 moles hexaalkylphosphotriamide or N-alkyl pyrrolidone are used per mole of trichloroethylene.

9. A process according to claim 1 wherein the reaction is conducted at 60–120° C.

10. A process according to claim 1 wherein about 1 mole of trimethylchlorosilane or dimethylphenylchlorosilane, about 2 gm. atoms magnesium or zinc and about 1 gm. mole trichloroethylene are reacted together in hexamethylphosphotriamide or N-methyl-pyrrolidone at 60–120° C.

References Cited

UNITED STATES PATENTS

| | | | |
|---|---|---|---|
| 2,671,100 | 3/1954 | Frisch et al. | 260—448.2 Q |
| 2,671,101 | 3/1954 | Frisch et al. | 260—448.2 Q |
| 2,849,472 | 8/1958 | Pines et al. | 260—448.2 E |
| 3,249,630 | 5/1966 | Viehe | 260—448.2 QX |
| 3,332,916 | 7/1967 | Hay | 260—448.2 QX |
| 3,418,385 | 12/1968 | Skinner et al. | 260—448.2 EX |

OTHER REFERENCES

Bazant et al., "Organosilicon Compounds," vol. 1, Academic Press, New York (1965), pp. 252–256. Copy in A.U. 112.

Noll, "Chemistry and Technology of Silicones," Academic Press, New York (1968), pp. 41–49 and 131. Copy in A.U. 112.

JAMES E. POER, Primary Examiner

P. F. SHAVER, Assistant Examiner

U.S. Cl. X.R.

260—488.2 Q